United States Patent
Green

(10) Patent No.: US 8,723,371 B2
(45) Date of Patent: May 13, 2014

(54) SYSTEMS AND METHODS FOR STORING AND/OR TRANSMITTING ELECTRICAL ENERGY

(75) Inventor: Tessa Durakis Green, Westport, CT (US)

(73) Assignee: Tessa Durakis Green, Westport, CT (US)

( * ) Notice: Subject to any disclaimer, the term of this patent is extended or adjusted under 35 U.S.C. 154(b) by 854 days.

(21) Appl. No.: 12/871,205

(22) Filed: Aug. 30, 2010

(65) Prior Publication Data

US 2011/0048800 A1 Mar. 3, 2011

Related U.S. Application Data

(60) Provisional application No. 61/238,535, filed on Aug. 31, 2009.

(51) Int. Cl.
*H01B 1/00* (2006.01)

(52) U.S. Cl.
USPC ............ 307/149; 307/145; 361/225; 361/228

(58) Field of Classification Search
USPC ............................ 307/149, 145; 361/225, 228
See application file for complete search history.

(56) References Cited

U.S. PATENT DOCUMENTS

| | | | | |
|---|---|---|---|---|
| 3,996,064 A | * | 12/1976 | Thaller | 320/128 |
| 7,820,321 B2 | * | 10/2010 | Horne et al. | 429/149 |

* cited by examiner

*Primary Examiner* — Fritz M Fleming

(57) ABSTRACT

According to some embodiments, systems and or methods may be provided to transport electrical energy from a first location having an electrical energy source to a second location, remote from the first location and having a load to accept electrical energy. A first pipeline between the first and second locations may include a first chamber containing a cathodic fluid. A second pipeline between the first and second locations may include a second chamber containing an anodic fluid, and at least of a portion of said first and second pipelines include a contiguous area. A membrane may separate the cathodic and anodic fluids at said contiguous area to exchange electrical energy between said fluids and create an electrochemical storage cell across said membrane. By utilizing additional alternating layers of said electrolyte, casing and membrane multiple cells may be created.

7 Claims, 9 Drawing Sheets

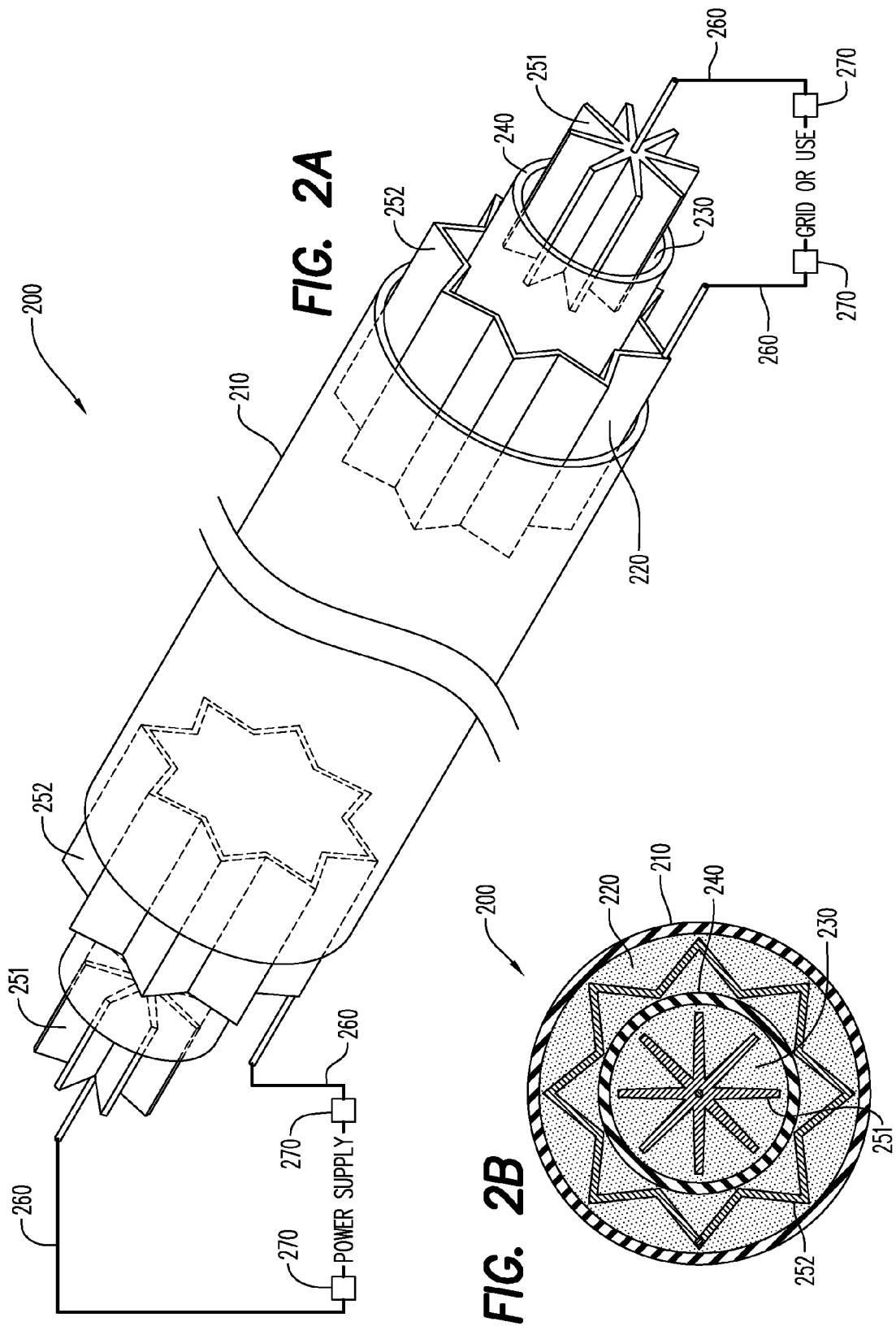

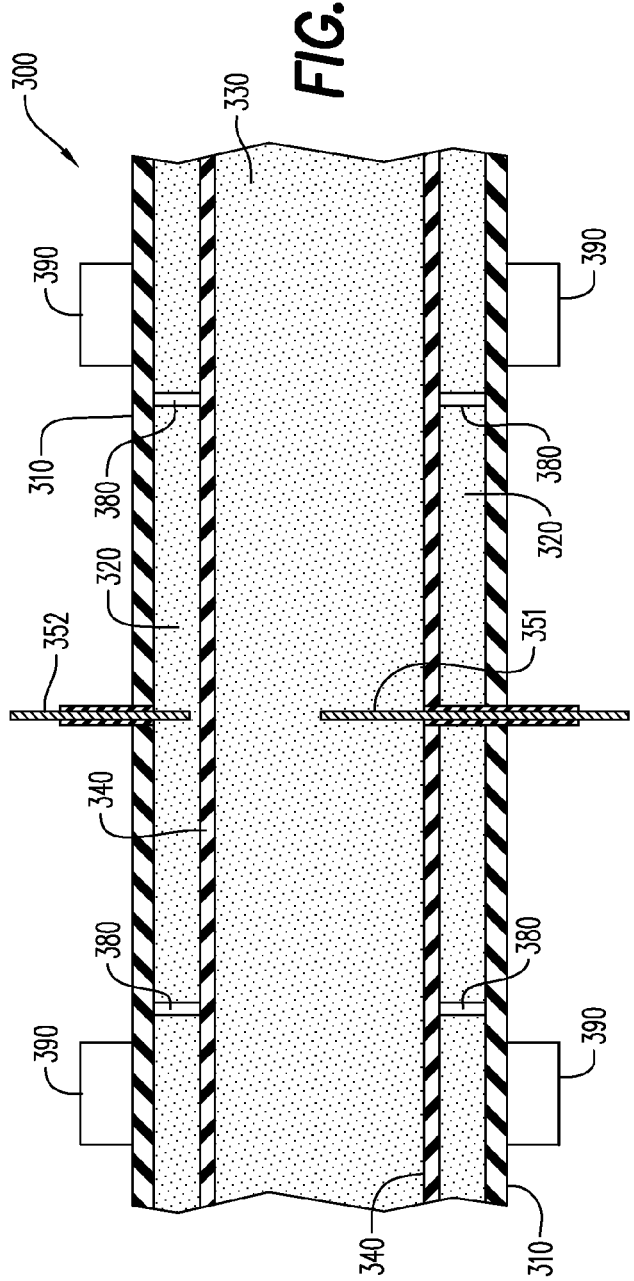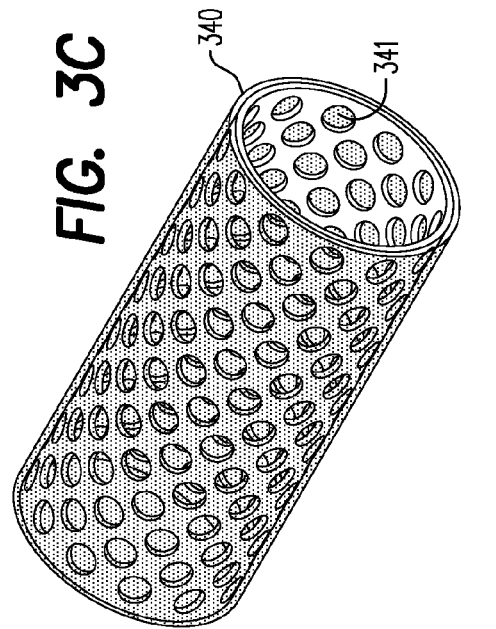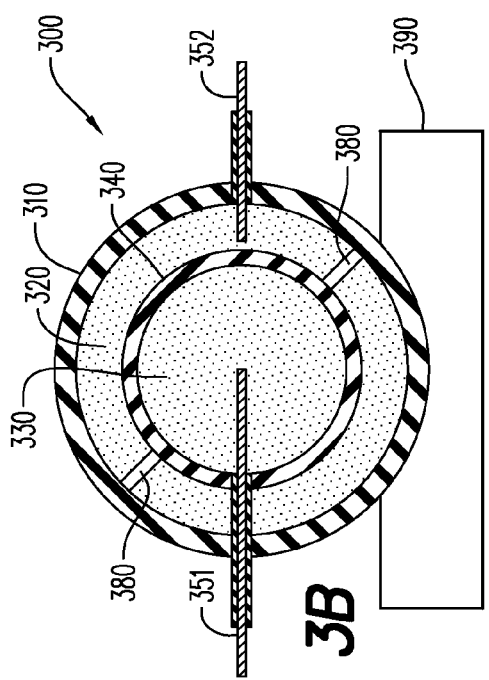

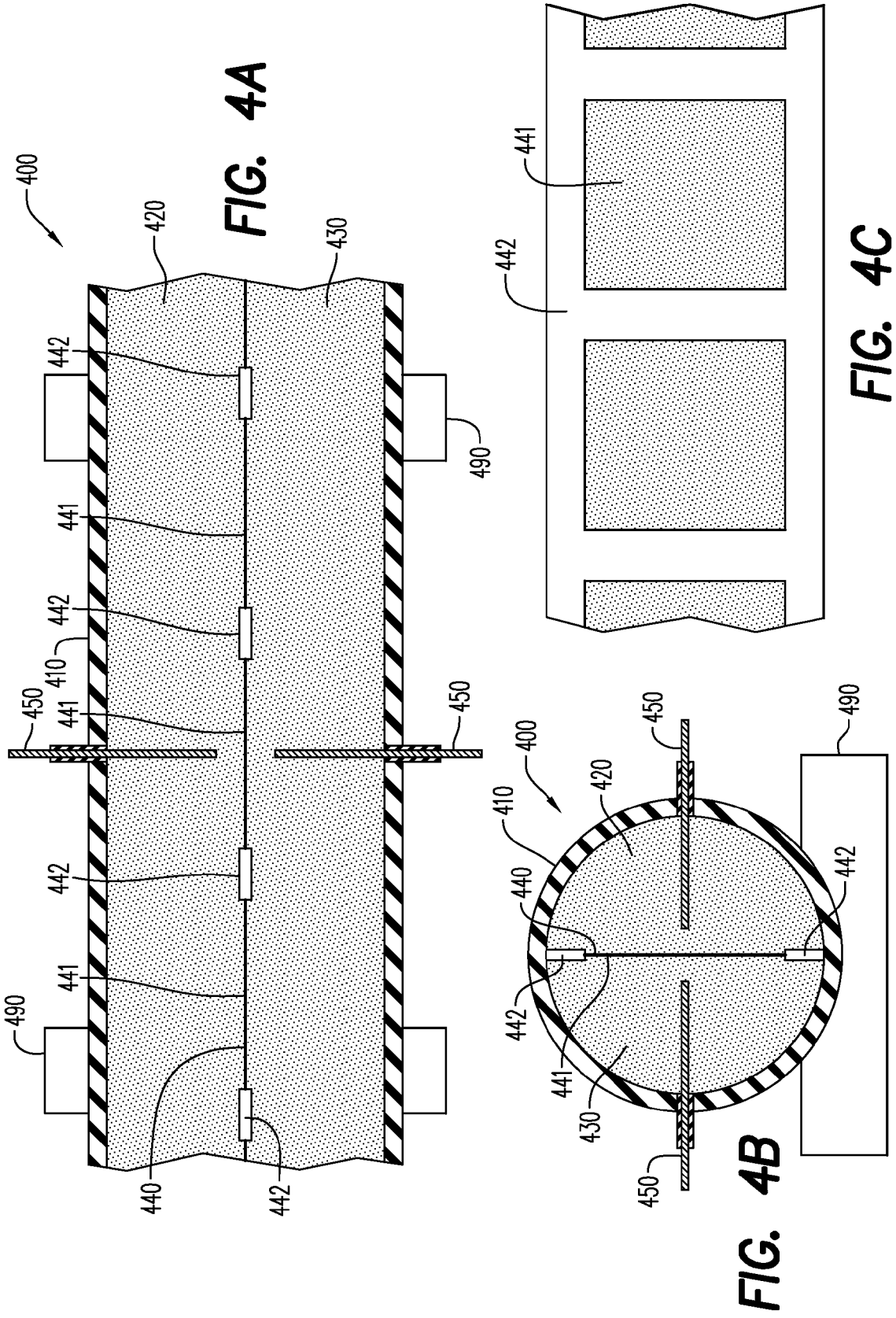

SYSTEMS AND METHODS FOR STORING AND/OR TRANSMITTING ELECTRICAL ENERGY

CROSS-REFERENCE TO RELATED APPLICATION

The present application claims the benefit of U.S. Provisional Application No. 61/238,535 entitled "System for Storing and Transporting Electrical Energy", filed Aug. 31, 2009.

FIELD

The present invention relates to storing and/or transmitting electrical energy. In particular, some embodiments of the present invention are directed to storing and/or transporting electrical energy in connection with cathodic and anodic fluids.

BACKGROUND

Many of the renewable energy generation systems proposed, built, and utilized today generate power inconsistently, far from locations where it is needed and out of sync with demand. Many of these existing energy generation plants, including those with non-renewable sources, cannot efficiently change output to match demand fluctuations, so additional generators must either be turned on at a moment's notice or generate unused power during periods of reduced demand. Current technology relies on overhead high voltage transmission lines to transport electrical energy. Voltage fluctuations, system inconsistencies and inefficiencies cost the U.S. an estimated 119 billion dollars per year. Efforts being made to modernize the system into a "smart grid" are adding control, metering and monitoring capabilities, but do not change the fundamental problem of the overhead transmission line concept; namely the instantaneous nature of transport and inability to store large quantities of power. Another problem with overhead transmission lines is that construction of new lines is often challenged due to the environmental and aesthetic impact of these lines.

A variety of intermittent electrical energy storage systems have been proposed and are being utilized on a small scale, but, to date, none of these systems have won wide acceptance. An example of such a storage system is the flow battery design described in U.S. Pat. No. 3,996,064. This system utilizes two rectangular tanks containing vanadium electrolytes, separated by a membrane. Oppositely charged electrodes are inserted into each tank to charge and discharge. While this system may be capable of efficiently storing electrical energy it is only accessible at a single location and it does not allow for energy transportation.

Therefore, it may be advantageous to provide improved systems and methods to store and/or transport electrical energy in a manner that allows for relatively quick and efficient transportation over relatively great distances.

SUMMARY

To alleviate these problems, some embodiments of the present invention introduce systems and methods of storing and/or transmitting electrical energy in connection with cathodic and/or anodic fluids separated by a membrane.

This invention may, for example be used for some or all of the following three purposes:
1. To transport power from point A to point B and to points in between A and B
2. To store excess power.
3. To absorb and store power surges.

BRIEF DESCRIPTION OF THE DRAWINGS

FIGS. 2 A and B illustrate a portion of an energy pipeline according to some embodiments of the present invention.

FIG. 3 A through C provides detailed views of a portion of the present invention in an embodiment that utilizes concentric chambers and a circular membrane.

FIG. 4 A through C provide detailed views of a portion of the present invention in an embodiment that utilizes a bisecting membrane.

DETAILED DESCRIPTION

Figure 1:
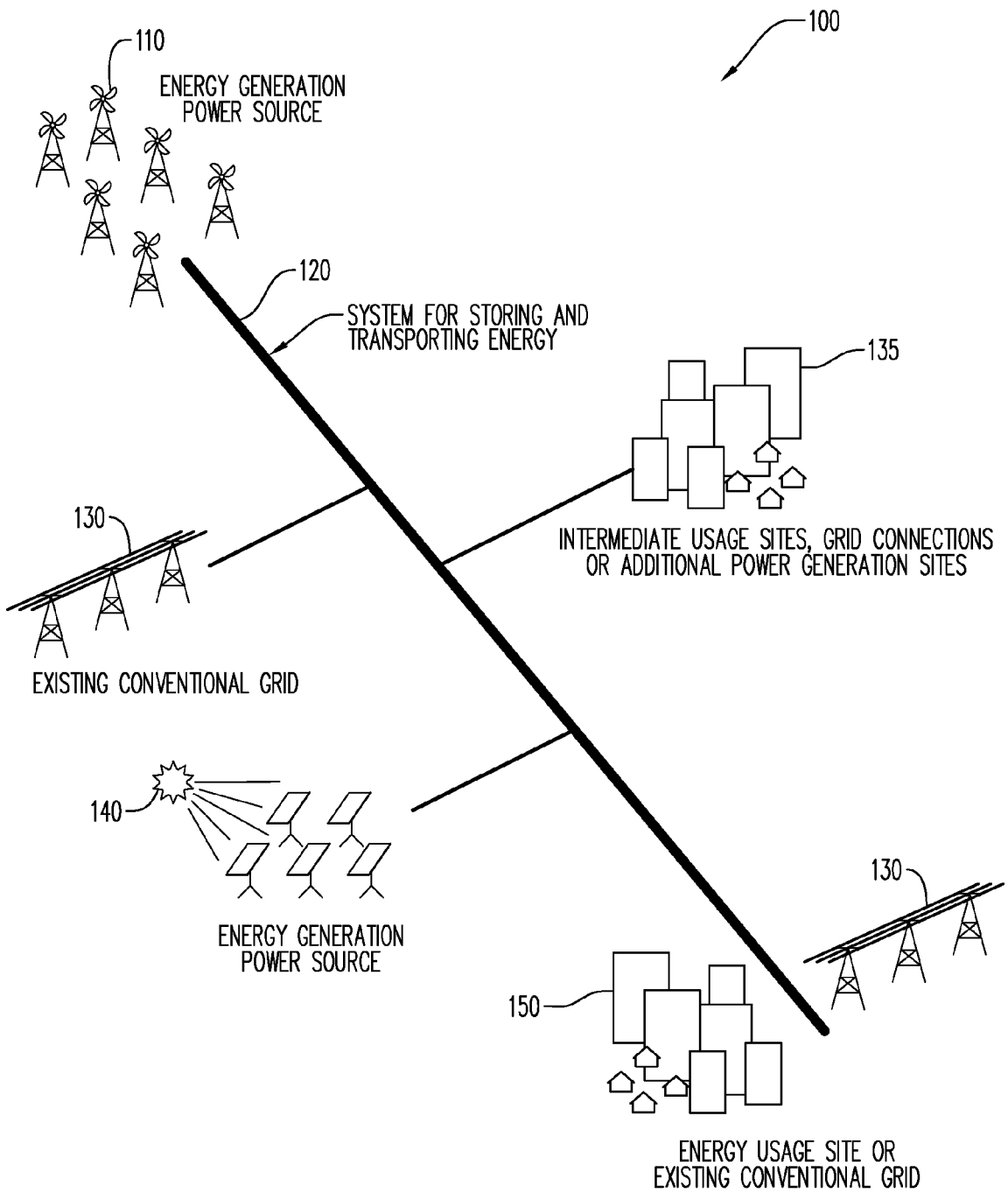
FIG. 1 is system 100 according to some embodiments of the present invention.

Referring now to the drawings, FIG. 1 is system 100 according to some embodiments of the present invention. The system 100 includes an energy generation power source 110 coupled to an apparatus 120 for storing and/or transporting electrical energy. The apparatus 120 may also be coupled to an existing conventional power grid 130 for integration into the current system.

Moreover, the apparatus 120 may be coupled to intermediate usage sites, grid connectors, and/or additional power generation sites 135. This allows the system to transport energy to multiple locations, rather than simply allowing a two-way flow. Further, the apparatus 120 may be coupled to additional energy generation power sources 140, such as solar or wind sources, adding additional power. Finally, the apparatus 120 may be coupled to an energy usage site 150. Thus, the apparatus 120 may facilitate the storage and/or transport of electrical energy in accordance with any of the embodiments described herein. These transport distances may be on the order of miles.

For example, FIG. 2 illustrates a portion of an energy pipeline 200 in accordance with some embodiments of the present invention. In particular, the pipeline 200 may comprise an outer casing 210. The outer casing 210 is preferably made of a material that does not interact with the electrolytes contained in chambers 220 and 230. This outer casing may be surrounded by insulation (not shown in FIG. 2). Outer chamber 220 contains one of the two electrolytes (anodic or cathodic), while inner chamber 230 contains the other. The outer chamber 220 is defined as the area between the outer casing 210 and the membrane 240. The inner chamber 230 is defined as the volume within the membrane 240. The two chambers are divided by membrane 240, which is shaped as a tube. The cylinders of the chambers 220 and 230 are concentric. The radii of the two chambers may be sized so that the volume of chamber 220 is equal to the volume of chamber 230 and the ratio of electrolyte to membrane 240 may maximize efficiency. The radii of the entire system may be adjusted for transportation distances and volume of power storage and transport needed. Within the inner chamber is electrode 251 and within the outer is electrode 252. Electrode 252 is preferably circular and is inserted into the outer chamber without contacting membrane 240. Electrode 251 may be shaped so as to maximize surface area in contact with electrolyte and may extend into the chamber 230 for a distance that maximizes efficiency. Electrode 251 may be installed in the inner chamber 230 without contacting the membrane 240. Electrode 252 may be shaped so as to maximize surface area in contact with electrolyte and extend into the chamber 220 for a distance that maximizes efficiency. Both electrodes 251 and 252 may be sized so as to have equal surface area. Electrodes may be utilized at the power supply end of the invention to transfer energy from the electrical source to the electrolyte and at the other end of the system to transfer energy from the electrolyte to the grid or use apparatus. Insulated wires 260 may be attached at the ends of the electrodes 250 and may conduct electricity without contacting the membrane 240 or outer casing 210. Insulated wires 260 are utilized to transfer electricity to and from the electrodes. Switches, meters and limiting diodes, regulators, etc., 270 are used to regulate, measure and control the flow of power, and are attached to the insulated wires 260 coming from the power source and going to the grid or power use. Additional layers of electrolyte, membrane and casing may be used to create multiple cells.

FIG. 3 is a detail of energy pipeline 300 as described in FIG. 2, wherein a possible intermediate discharge site is illustrated. The inner chamber 330 may be filled with one electrolyte, and the outer chamber 320 may be filled with the other, with one electrolyte being cathodic and the other anodic. The two chambers may be concentric cylinders. They may be separated by an inner casing 340 which is preferably made of a material non-reactive with the electrolytes. This casing material may be perforated and the perforations covered with sections of membrane 341. Alternately, the inner casing may be perforated and then coated with membrane, with the non-reactive substance serving as a frame that preserves the cylindrical structure of the membrane. The inner casing may be further supported with the use of struts or fins 380. The struts or fins 380 may protrude through the outer chamber 320 and may be connected to the outer casing 310. The outer casing 310 may surround the entire structure and prevent interaction of the electrolytes with the outside environment, including temperature-related insulation (not shown in FIG. 3). The electrode 351 into the inner chamber 330 may be made of carbon or another conductor. The section of the inner electrode 351 that travels through the outer chamber 320 may be coated with non-conducting insulation, thus preventing electrical interference. The outer electrode 352 may be inserted through the outer casing 310 into the outer chamber 320 and the electrolyte contained therein. These electrodes may be inserted into a middle section of the transportation pipeline and utilized at intermediate discharge stations. In the event that the structure is used aboveground, support pads 390 may be added to stabilize the structure.

FIG. 4 is a detail of energy pipeline 400 as described in FIG. 2, wherein a possible intermediate discharge site is illustrated. However, in this embodiment, the chambers may be semicircular prisms, and the membrane is preferably vertical, but may be constructed at a different angle. This structure may consist of a chamber 420 and a symmetrical chamber 430. The chambers each may occupy half of the volume of the pipeline 400. Chamber 430 and chamber 420 may be divided by a membrane 440 that may be a diameter of a cross-section of the pipeline 400. The outer casing 410 may contain the chambers and membrane. Outer casing 410 is preferably constructed of a material non-reactive with the electrolytes, and may include any insulating materials necessary. Electrodes 450 may be inserted on either side of membrane 440, and may be constructed in any functioning geometry so long as they are in contact with electrolytes contained in the chambers 420 and 430. The membrane 440, particularly if it is not strong enough to support its own structure, may be broken into smaller pieces 441 and may be inserted along a supporting framework 442 which may be constructed from a non-interacting material. If the pipe is used above ground, support pads 490 may be added to prevent movement.

Figure 5:
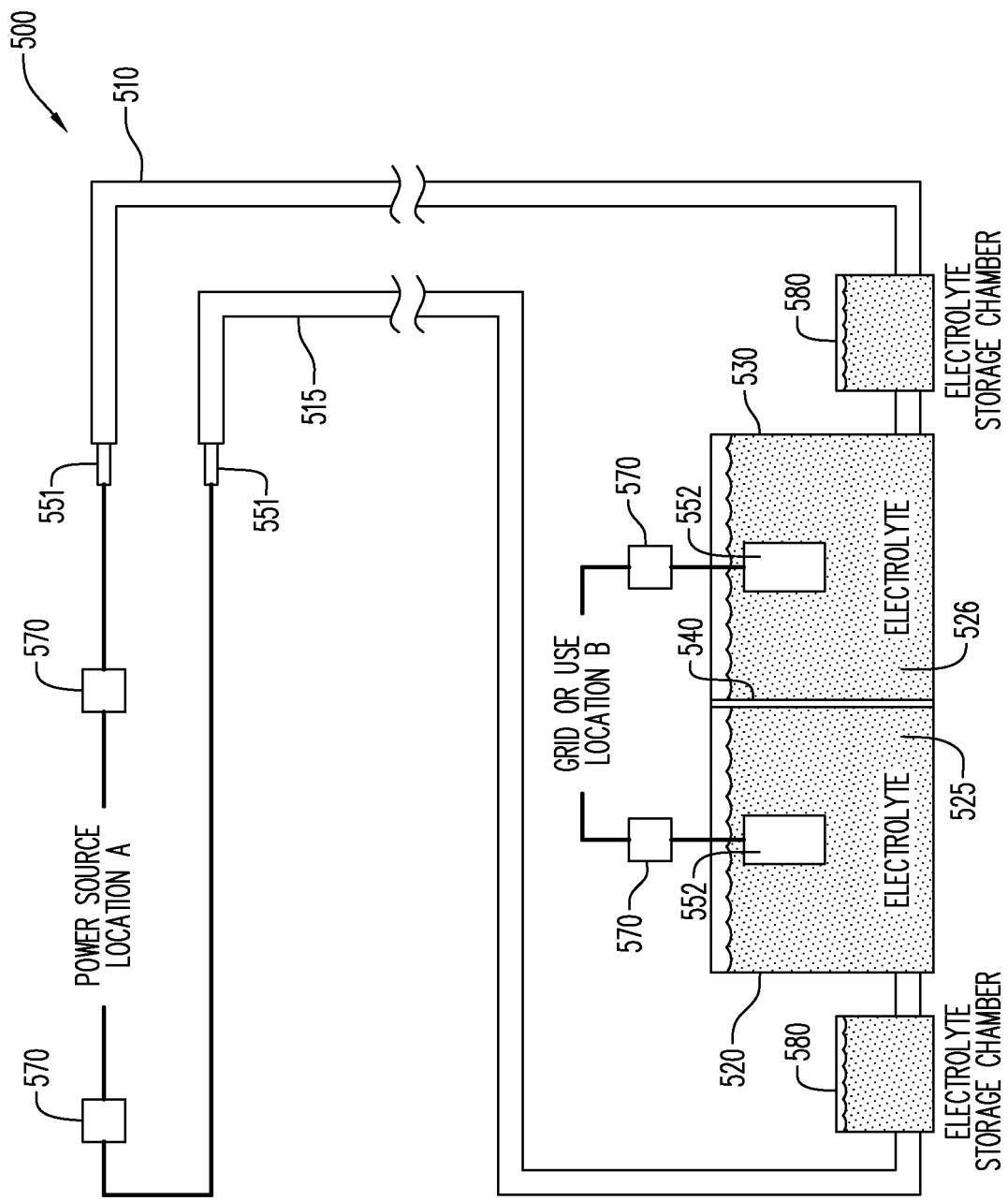
FIG. 5 illustrates an embodiment wherein the fluids are stationary throughout the pipeline portion of the present invention.

FIG. 5 illustrates a structure 500 wherein the electrolytes may be charged while in a pipe, but a standard flow battery setup may be used for discharge. Pipelines 510 and 515 may be filled with electrolyte, with one containing the cathodic fluid 525 and the other containing anodic fluid 526. The two lines may be kept separate when charged. They are shown for clarity as separate pipelines, but may also be constructed in a concentric fashion with a non-conducting casing between the two chambers. Regulating equipment 570 controls the flow of electricity into the pipes from the power source. Electrodes 551 from the power source may be inserted directly into the pipes for charging. Energy disperses throughout the electrolyte. At the other end of the line, the electrolytes may sit in two chambers, with chamber 520 filled with one of the two electrolytes (anodic and cathodic) and 530 filled with the other. The two chambers may be separated by a membrane 540. Electrodes 552 located in each chamber may facilitate discharge. Again, flow of electricity out of the system may be regulated by switching and metering equipment 570. The capacity of the system may be expanded by the addition of electrolyte storage chambers 580. Pressure, temperature, and other fluid flow monitoring equipment may be utilized within the system (not shown).

Figure 6:
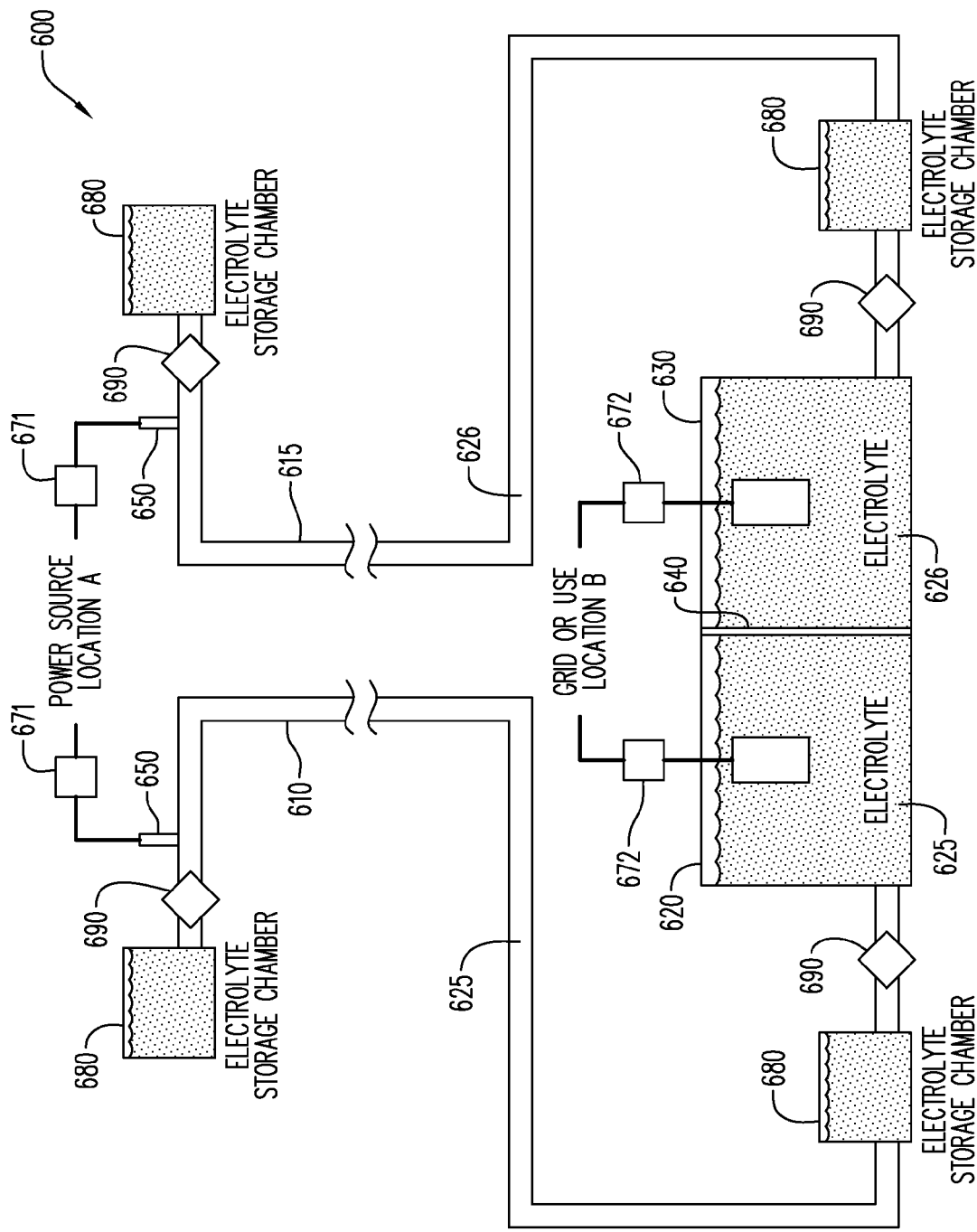
FIG. 6 illustrates an embodiment wherein the fluids are charged using electrodes placed directly into the pipeline portion and the fluids are circulated throughout the present invention

FIG. 6 illustrates a structure 600 that is similar to the structure 500, excepting that the fluid in the structure in FIG. 6 may be in motion and that in FIG. 5 may not be. First, voltage regulators and various switching and metering equipments 671 may regulate the flow of electricity into the main pipes. Pipeline 610 may be filled with a fluid containing one of the two electrolytes 625, and pipeline 615 may be filled with the other, electrolyte 626. Electrodes 652 from the power source 650 may charge these fluids, and may be added at the end of the pipe or at intermediate locations. The fluids in the pipes may be moved by pumps 690 at intermediate locations and again during removal from the pipes. Once removed from the pipes, they may enter a traditional flow battery setup, wherein cells containing two electrolyte chambers 620 and 630 divided by a membrane 640 may be charged or discharged. Here, they are preferably discharged only, with the flow of electricity preferably regulated by switching and metering equipment 672. After discharge, the electrolyte may be pumped back to the charging station where it may be recharged to complete the cycle. For example, where the power generation source is solar, the charged electrolyte from the solar power generation site might be pumped to the demand site during the day and then at night the direction of flow reversed and the discharged electrolyte pumped from the demand site back to the generation site. Where used in a system with sporadic energy production the electrolyte might be stored in chambers 680 at either end until needed. If electrolytes are used that cannot be mixed, they might be pumped and stored separately. In the case of electrolytes that can be mixed, there might need to be only one pipe in each direction or in one of the two directions. An advantage of such embodiments may be that the membrane can be maintained and replaced without significantly disturbing the pipeline components of the system. Pressure, temperature, and other fluid flow monitoring equipment may be utilized within the system (not shown).

Figure 7:
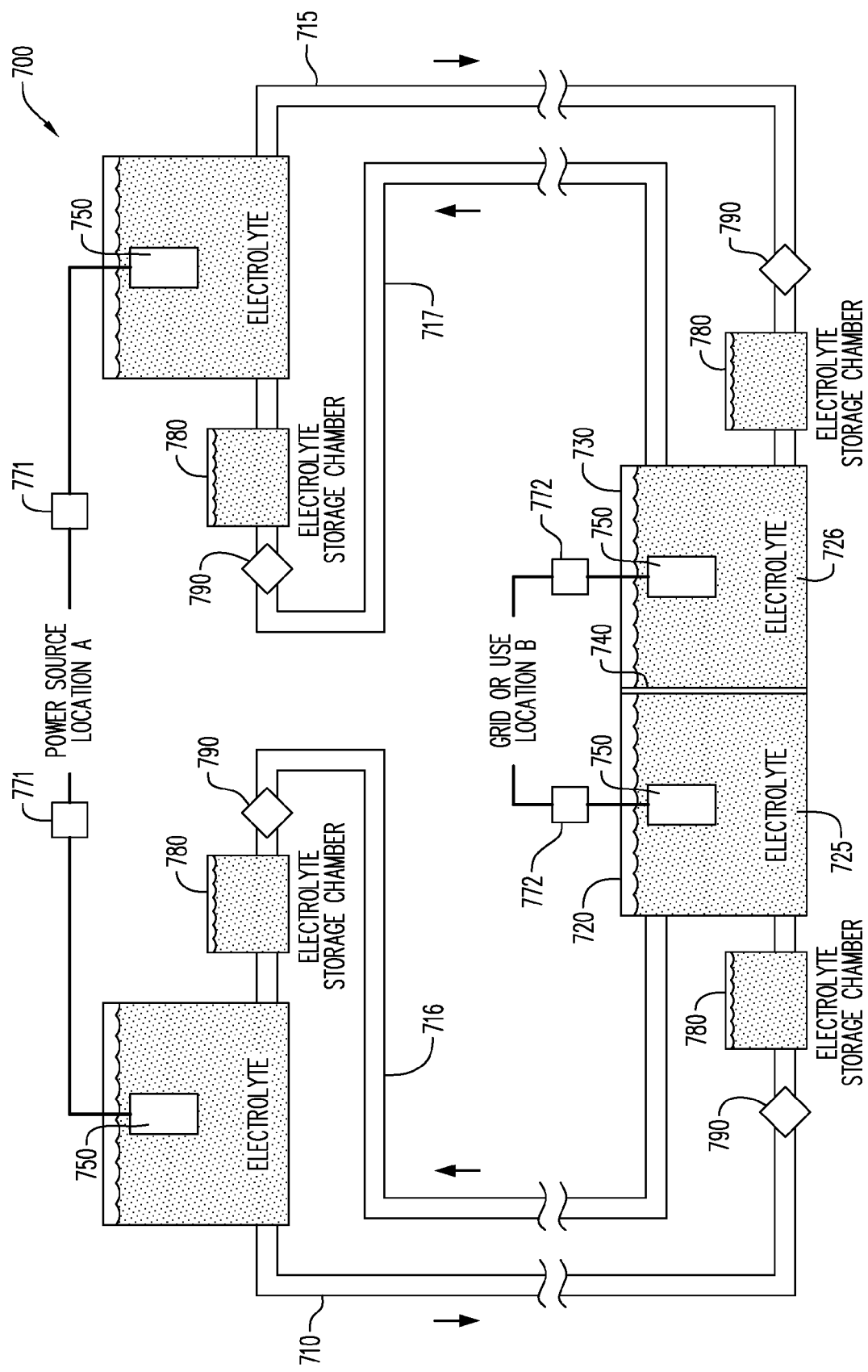
FIG. 7 illustrates an embodiment wherein the fluids are charged using electrodes in separate chambers and then circulated throughout the present invention.

FIG. 7 illustrates structure 700, wherein the electrolytes may be charged individually using electrodes 750 inside of charging tanks. The flow of electricity into the system may be regulated by switches, limiting diodes, and metering equipment 771. Then, the cathodic and anodic electrolytes 725 and 726 may be moved with pumps 790 through pipelines 710 and 715. The fluids may then be pumped into two chambers 720 and 730 separated by a membrane 740. Electrodes 750 may be used to discharge the fluids, and the flow of electricity to grid or use may be regulated by switches, limiting diodes, and other metering equipments 772. The discharged fluids may then pumped through either a pipe for discharged electrolytes or two separated discharge pipes 716 and 717, and the cycle may be repeated. In this embodiment the electrolyte may be circulated continuously and/or stored in chambers 780. Pressure, temperature, and other fluid flow monitoring equipment may be utilized within the system (not shown).

Figure 8:
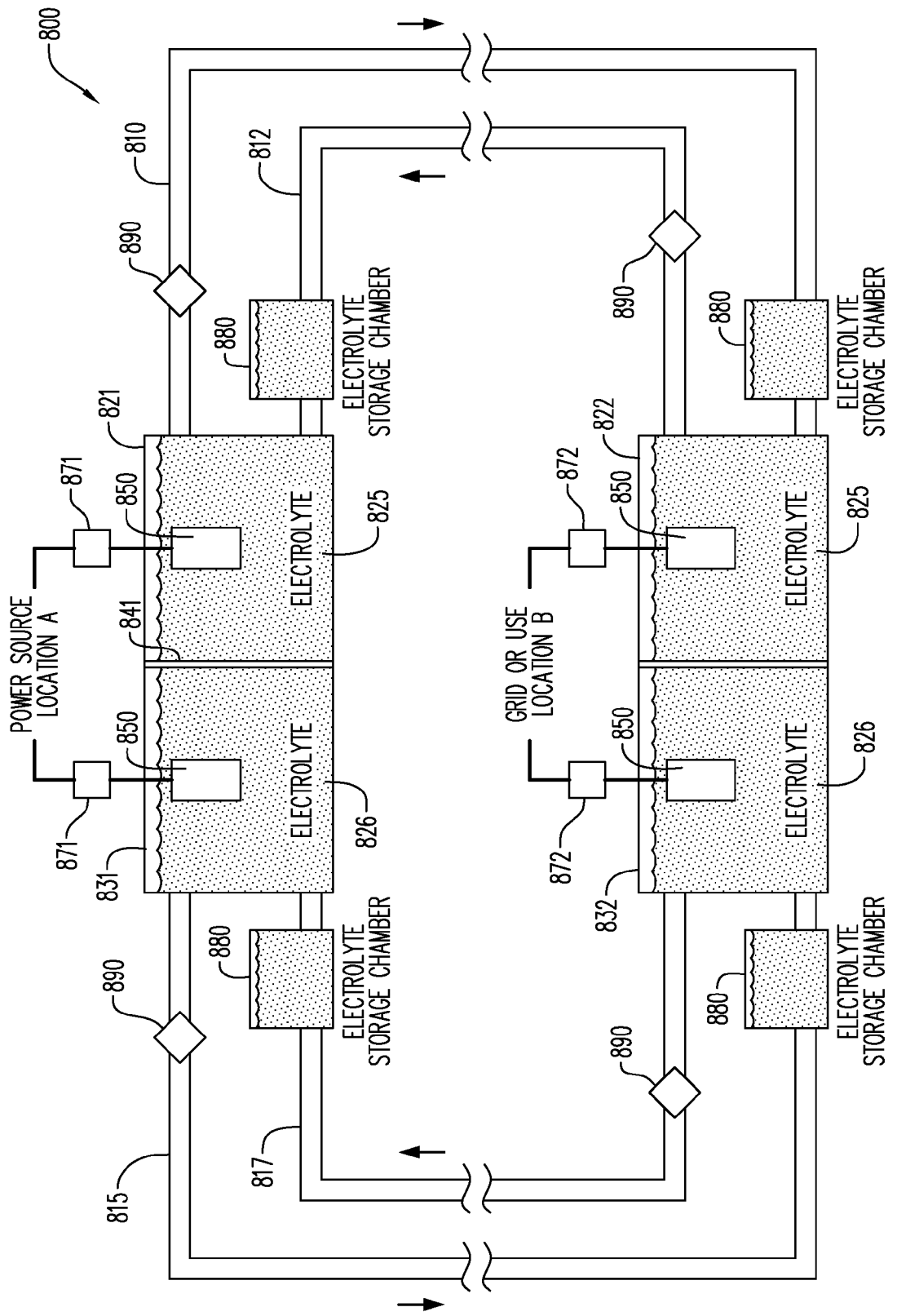
FIG. 8 illustrates an embodiment wherein the fluids are charged using electrodes in membrane separated chambers and then circulated throughout the present invention.

Structure 800 in FIG. 8 is similar to structure 700, excepting that structure 800 may be charged through a standard flow battery setup. Here, the flow of electricity into the system is regulated by switches and meters 871. The electrolytes may be charged using a standard redox-flow battery, in which electrodes 850 are inserted into chambers 821 and 831. Each chamber may be filled with an electrolyte-containing liquid 825 and 826, with the two chambers having opposite charges. The two chambers 821 and 831 may be divided by a membrane 841. To change the speed of charging, multiple cells may be used. Pipelines 810 and 815 may be filled with liquids containing electrolytes of opposite charges, corresponding to the liquids in the two chambers. Fluids may be transferred from the chambers to the pipes using pumps 890. They may then travel through the pipe to a setup that is preferably identical to the charging assembly. At the discharge station, however, current may be removed rather than added to the system. Two electrolyte chambers 822 and 832 may be filled with the oppositely charged electrolytes 825 and 826. Electrodes 850 may be inserted into them, and switches and meters 872 may regulate the flow of current. This cell may be replicated as needed. After discharge, electrolytes may be pumped or transported back to the charging station through pipelines 812 and 817. The process may be repeated or run continuously. Charged and/or discharged electrolyte may be stored in chambers 880. Pressure, temperature, and other fluid flow monitoring equipment may be utilized within the system (not shown).

Figure 9:
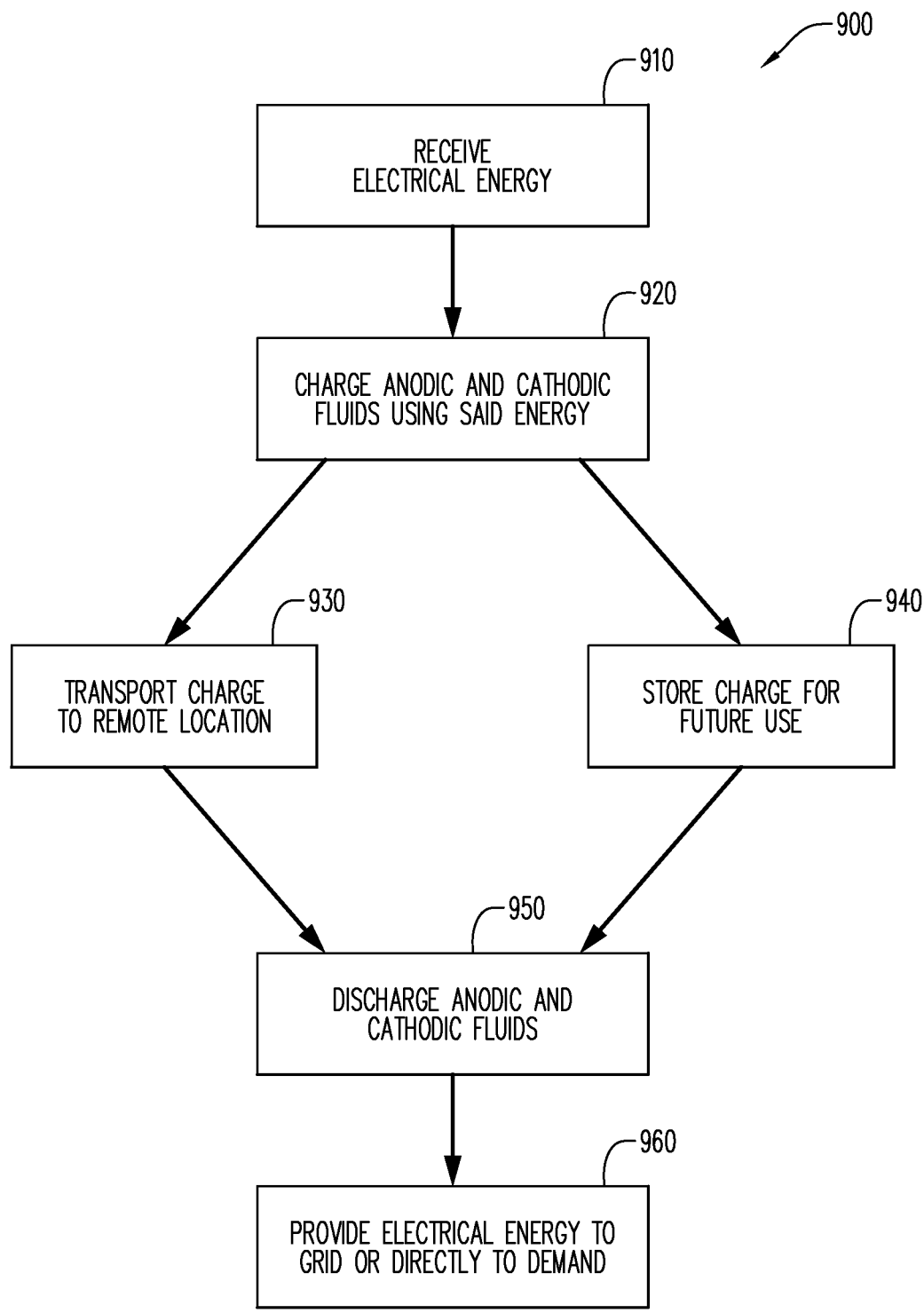
FIG. 9 is a flow diagram illustrating a method of storing and/or transporting electrical energy in accordance with some embodiments.

FIG. 9. Is a flow diagram 900 illustrating a method of storing and/or transporting electrical energy in accordance with some embodiments. The flow chart described herein does not imply a fixed order to the steps, and embodiments of the present invention may be practiced in any order that is practicable. At 910, energy is received by the system. At 920, the energy is used to charge cathodic and anodic fluids. At 930, the energy is transported to a remote location. At 940, the energy is stored for as long as is needed, before, after, or during this period of transportation. At 950, the energy is discharged. At 960, energy is provided to the grid or directly to demand.

Thus, some embodiments of this invention may store electricity in a manner that allows for relatively quick and efficient transportation over relatively great distances. By combining electrical energy transmission and storage into a single system, this invention will reduce operating costs and enable increased use of renewable energy sources. Through absorption and storage of electrical energy at multiple locations, some embodiments of the present invention may act as a buffer for the current power grid, absorbing excess power and/or surges and storing the energy for future use. Furthermore, depending on topographical, environmental, geological and political conditions the system may be built as a pipeline following existing design and engineering criteria and either be suspended from support pads or buried underground, substantially reducing the aesthetic and environmental impact of the electrical transmission grid.

The preceding illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although particular configurations of the present invention have been described with respect to various elements provided herein, it will be appreciated that many other variations on the above could be constructed in addition, such as a rectangular pipe or membranes with internal support structures. Although certain materials listed herein could be used, such as PVC piping for the outer casings of various pipes, or vanadium for the electrolyte, other materials may also be used.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system to transport electrical energy from a first location having an electrical energy source to a second location, remote from the first location and having a load to accept electrical energy, comprising: a first pipeline between the first and second locations, the first pipeline including a first chamber containing a cathodic fluid; a second pipeline between the first and second locations, the second pipeline including a second chamber containing an anodic fluid, wherein at least of a portion of said first and second pipelines include a contiguous area; and a membrane separating the cathodic and anodic fluids at said contiguous area to exchange electrical energy between said fluids and create an electrochemical storage cell across said membrane; and wherein said first and second pipelines each have a plurality of intermediate locations between said first and second locations, said intermediate locations coupled to intermediate usage sites, grid connectors, and/or additional power generation sites, thereby allowing energy transport to multiple locations along the pipelines.

2. The system of claim 1, wherein said system further has a capacity to store energy therein.

3. The system of claim 1, wherein said first pipeline forms an outer member extending substantially the length thereof from said first location to said second location, and in which said second pipeline is formed of said membrane extending from said first location to said second location, a mounting element to mount said membrane concentrically within said first pipeline to form therein concentric chambers to hold said anodic and cathodic fluids therein separated by said membrane and to form a structure in which the fluids together with said membrane form a distributed system between said first, second and intermediate locations along which energy is exchanged between said fluids as well as being accepted at said source and delivered to said load at the second location.

4. The system of claim 1, wherein each said pipeline extends substantially the length thereof from said first location to said second location and is bisected by a membrane divider forming two chambers within said pipeline for holding said anodic and cathodic fluids therein separated by said membrane to form a structure in which the fluids together with said membrane form a distributed system between said first, second and intermediate locations along which energy is exchanged between said fluids as well as being accepted at said source and delivered to said load at the second location.

5. The system of claim 1, wherein said first and second pipelines extend substantially the length thereof from said first location to said second location and are used to store and transport said anodic and cathodic fluids therein, said fluids are stored in chambers at said first and second locations where they are separated by said membrane.

6. A method to transport electrical energy in a pipeline from a first location having an electrical energy source to a second location, remote from the first location and having a load to accept electrical energy, the method comprising: receiving energy at one end of the pipeline; utilizing the energy received therein to charge anodic and cathodic fluids; discharging said cathodic and anodic fluids at the second location and providing a plurality of intermediate locations between said first and second locations, said intermediate locations coupled to intermediate usage sites, grid connectors, and/or additional power generation sites, thereby allowing energy transport to multiple locations along the pipeline.

7. A method to store electrical energy during its transportation in a pipeline from a first location having an electrical energy source to a second location, remote from the first location and having a load to accept electrical energy, the method comprising: receiving energy at one end of the pipeline; utilizing the energy received therein to charge anodic and cathodic fluids; storing the energy in said fluids until time of utilization; discharging said cathodic and anodic fluids at the second location; and providing a plurality of intermediate locations between said first and second locations, said intermediate locations coupled to intermediate usage sites, grid connectors, and/or additional power generation sites, thereby allowing energy transport to multiple locations along the pipeline.

* * * * *